US007006755B2

(12) United States Patent
Morinaga

(10) Patent No.: US 7,006,755 B2
(45) Date of Patent: Feb. 28, 2006

(54) STORAGE DEVICE WITH AN INDEX INDICATING A SEQUENTIAL RELATIONSHIP

(75) Inventor: Takeo Morinaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 1120 days.

(21) Appl. No.: 09/779,082

(22) Filed: Feb. 8, 2001

(65) Prior Publication Data

US 2001/0014211 A1 Aug. 16, 2001

(30) Foreign Application Priority Data

Feb. 10, 2000 (JP) ........................... P2000-038255

(51) Int. Cl.
*H04N 5/783* (2006.01)
*H04N 5/781* (2006.01)

(52) U.S. Cl. ........................... 386/68; 386/69; 386/70; 386/111; 386/125

(58) Field of Classification Search .................... 386/6, 386/33, 45, 69–70, 111–112, 125, 126, 95; H04N 5/783, H04N 5/781
See application file for complete search history.

(56) References Cited

U.S. PATENT DOCUMENTS

| | | | | |
|---|---|---|---|---|
| 5,719,982 | A * | 2/1998 | Kawamura et al. | 386/65 |
| 5,881,203 | A * | 3/1999 | Fujinami et al. | 386/96 |
| 6,049,694 | A * | 4/2000 | Kassatly | 725/144 |
| 6,456,782 | B1 * | 9/2002 | Kubota et al. | 386/98 |
| 2004/0170390 | A1 * | 9/2004 | Kim et al. | 386/95 |

* cited by examiner

*Primary Examiner*—Thai Tran
(74) *Attorney, Agent, or Firm*—Frommer Lawrence & Haug LLP; William S. Frommer

(57) ABSTRACT

In recording a stream in a storage device, a packet containing a start part of encoded image data subjected to intra-frame coding is identified from the input stream of packets. Presence or absence information of the start part of the encoded image data subjected to intra-frame coding is added to the packet on the basis of an identified result. The added presence or absence information of the start part is counted in a recording unit, and the count result is added in the recording unit onto the storage device. The number of start parts of the encoded image data subjected to intra-frame coding in every recording unit, together with the recording unit, can be recorded on the storage device. In playback, the number of start parts recorded in a recording unit on the storage device is detected to identify the recording units to be reproduced.

19 Claims, 6 Drawing Sheets

STORAGE DEVICE WITH AN INDEX INDICATING A SEQUENTIAL RELATIONSHIP

BACKGROUND OF THE INVENTION

1. Field of the Invention

The present invention relates to an information recording apparatus, an information reproducing apparatus, an information recording/reproducing apparatus, a digital broadcasting receiving apparatus and methods therefor, and more particularly, to an information recording apparatus, an information reproducing apparatus, an information recording/reproducing apparatus and methods therefor for adding and recording an index indicating the sequential relation of blocks in a predetermined block unit, in recording a transport stream on a storage device such as a hard disk.

2. Description of the Related Art

Recently, the digital satellite broadcasting has been commenced in regular basis, and various kinds of digital satellite broadcasting receiving equipment have been put on the market. Some equipment contain a storage device such as a hard disk for recording a received digital satellite broadcast program.

In the digital satellite broadcasting receiving equipment, when recording an Audio Visual (AV) stream such as a transport stream, a continuous AV stream is directly recorded in a predetermined block unit. In reproducing a stream from the storage device where such streams are recorded, discriminating the break of Group Of Pictures (GOP) that is a unit for assuring the image composition, for example, is difficult. In playback after skipping the blocks such as a trick play, e.g., a fast feed (skip playback), the skip playback in a unit of GOP was difficult. Generally, the GOP unit is equivalent to fifteen frames and ½ seconds long.

SUMMARY OF THE INVENTION

In view of the foregoing, an object of this invention is to provide an information recording apparatus, an information reproducing apparatus, an information recording/reproducing apparatus, a digital broadcasting receiver and methods therefor which are capable of identifying the initial location information in a reproduction unit with a simpler constitution and manner in reading a stream of packets from a storage device.

The foregoing object and other objects of the invention have been achieved by the provision of an information recording apparatus, an information reproducing apparatus, an information recording/reproducing apparatus, a digital broadcasting receiving apparatus wherein, in recording a stream in a storage device, a packet containing a start part of encoded image data subjected to intra-frame coding is identified from the input stream of packets, presence or absence information of the start part of the encoded image data subjected to intra-frame coding is added to the packet on the basis of an identified result, the added presence or absence information of the start part is counted in a recording unit onto the storage device, and the count result is added in the recording unit onto the storage device, whereby the number of start parts of the encoded image data subjected to intra-frame coding in every recording unit, together with the recording unit, can be recorded on the storage device, and in playback, the number of start parts recorded in a recording unit on the storage device is detected to identify the recording units to be reproduced. Therefore, the recording units to be reproduced can be easily identified in the playback after skipping a predetermined number of recording units.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
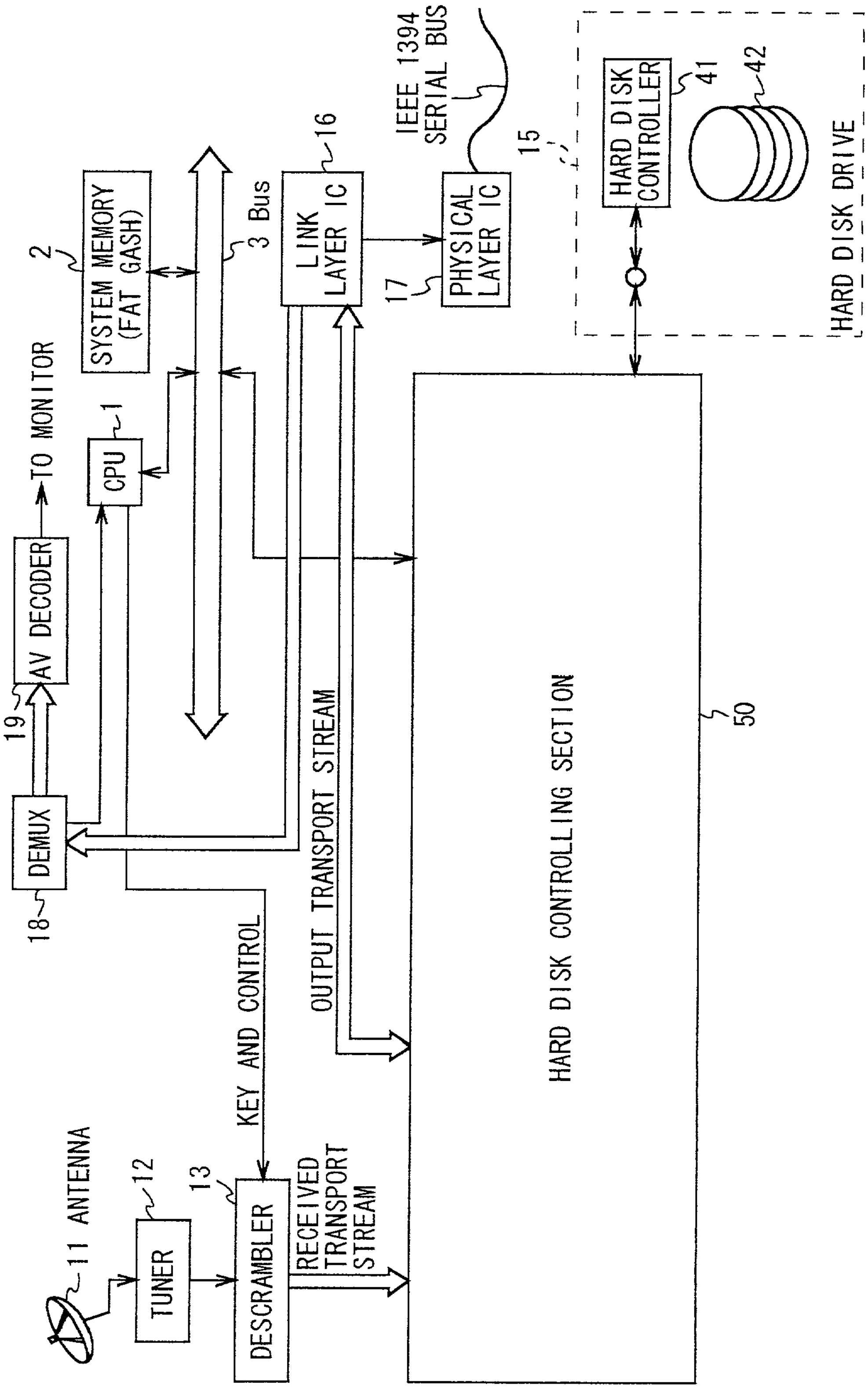
FIG. 1 is a block diagram showing the overall configuration of an information recording/reproducing apparatus according to the present invention.

Preferred embodiments of this invention will be described with reference to the accompanying drawings:

FIG. 1 shows a configuration in which a hard disk drive 15 as a storage device is contained in the digital satellite broadcasting receiving equipment for receiving the digital satellite broadcasting.

This digital satellite broadcasting receiving equipment receives a transport stream constituting a digital satellite broadcast program from a broadcasting station, not shown, and displays the images or sounds as its transport stream, in which the transport stream is recorded in a hard disk 42 of the hard disk drive 15, and the recorded transport stream can be reproduced at a later time.

That is, at an antenna 11, a digital satellite broadcast wave is received, and a received signal is output to a tuner 12. The tuner 12 demodulates the received signal from the antenna 11 to obtain a transport stream, which is then supplied to a descrambler 13. The descrambler 13 descrambles the scrambled transport stream from the tuner 12 using a decode key supplied from the CPU 1 under the control of the CPU 1, in which the descrambled transport stream is output to a hard disk controlling section 50.

The transport stream output from the descrambler 13 (hereinafter referred to as a received transport stream) is supplied to the hard disk controlling section 50.

Also, the hard disk controlling section 50 is supplied with a transport stream reproduced from the hard disk 42 in the hard disk drive 15 (hereinafter referred to as a reproduced transport stream), besides the received transport stream.

In reproducing the received transport stream, the hard disk controlling section 50 selects the received transport stream of two input transport streams (i.e., received transport stream and reproduced transport stream) and outputs this received transport stream as an output transport stream to a link layer IC 16.

The link layer IC 16 performs a process for a link layer in a layer structure of the Institute of Electrical and Electronics Engineers (IEEE) 1394 serial bus for the output transport stream, and outputs the output transport stream to a demultiplexer (DEMUX) 18.

Herein, a physical layer IC 17 performs a process for the link layer in the layer structure of the IEEE 1394 serial bus, and transfers isochronously the output transport stream via the IEEE 1394 serial bus to the IEEE 1394 equipment, not shown, if the output transport stream is received from the link layer IC 16.

The DEMUX 18 has a microcomputer or a memory, not shown, and demultiplexes a transport stream packet (hereinafter referred to as a TS packet) constituting the output transport stream from the link layer IC 16 to separate the section data (Program Association Table (PAT)), Program Map Table (PMT), a decode key for descrambling the scrambled transport stream, or the other control data) from the TS packet, analyze its contents, and output the required control data to the CPU 1.

Herein, the CPU 1 outputs the decode key among the section data supplied from the DEMUX 18 in the above way to the descrambler 13, and controls the descrambler 13 on the basis of the other section data supplied from the DEMUX 18.

The DEMUX 18 separates, from the output transport stream, the TS packet having the control data (section data) and the TS packet having the video data and audio data of a program (herein referred to as the AV data) that the user has selected by manipulating a remote commander, not shown, and outputs the separated TS packet to an AV decoder 19.

The AV decoder 19 decodes with the Moving Picture Experts Group (MPEG) 2 the TS packet from the DEMUX 18, the AV data obtained as a result being output to a monitor, not shown. Thereby, the monitor outputs (or displays) the images or sounds as a digital satellite broadcast program.

On the other hand, in the case where the received transport stream is recorded in the hard disk 42, the hard disk controlling section 50 selects a received transport stream among two input transport streams (i.e., received transport stream and reproduced transport stream).

Figure 2:
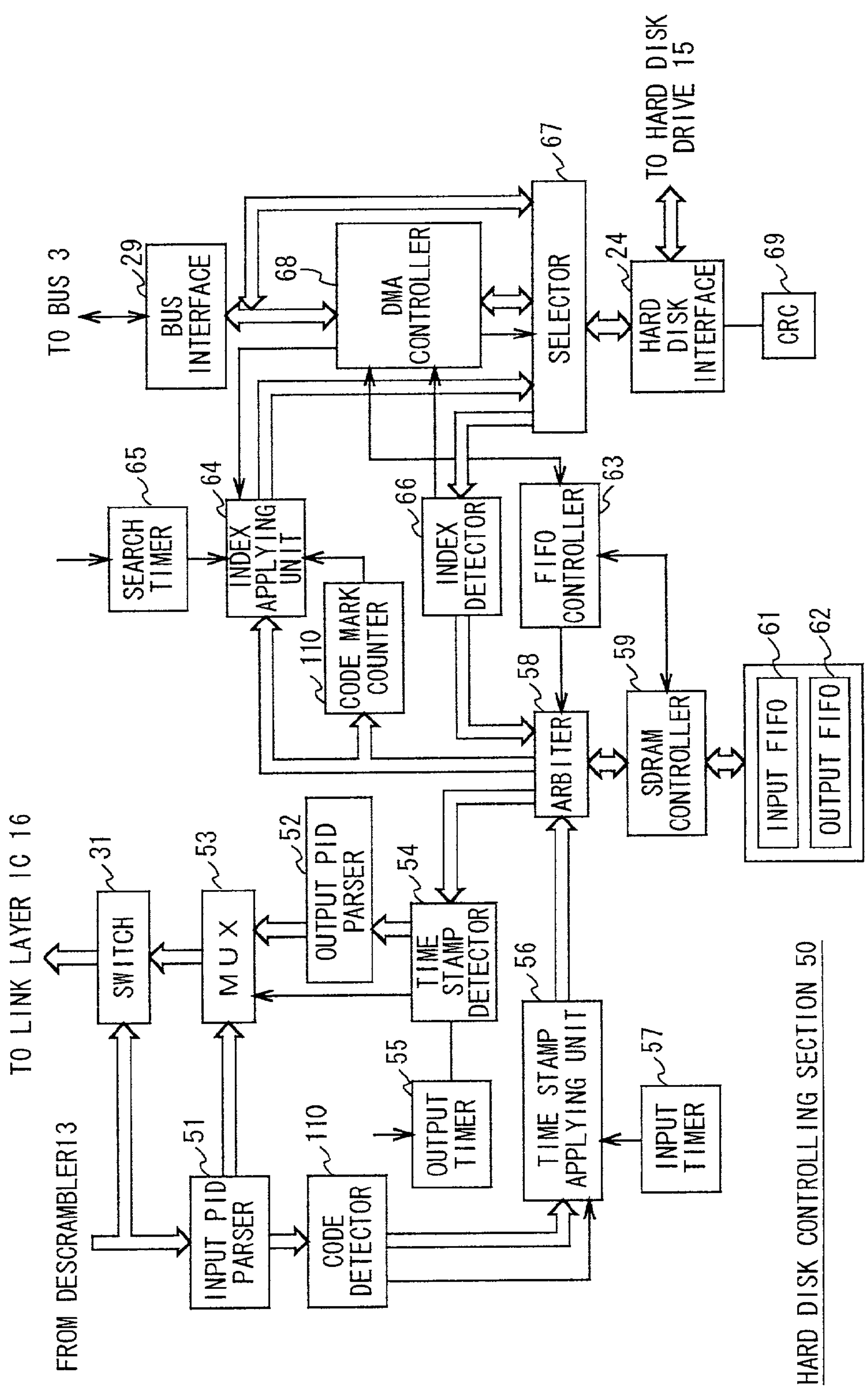
FIG. 2 is a block diagram showing the configuration of a hard disk controlling section.

That is, the received transport stream from the descrambler 13 is supplied to a switch 31 and an input Packet Identification (PID) parser 51 in the hard disk controlling section 50, as shown in FIG. 2. The input PID parser 51 extracts a TS packet useful for recording alone (hereinafter referred to as a recording packet), a TS packet useful for recording and controlling (hereinafter referred to as a recording/controlling packet), and a TS packet useful for controlling alone (hereinafter referred to as a controlling packet) from the TS packets constituting the received transport stream from the descrambler 13, the recording packet and the recording/controlling packet being output via a code detector 101 to a time stamp applying unit 56 , and the controlling packet being output to a multiplexer (MUX) 53.

The MUX 53 multiplexes the TS packet that the input PID parser 51 outputs and the TS packet reproduced from the hard disk that an output PID parser 52 outputs, and outputs the multiplexed packet to the switch 31.

The time stamp applying unit 56 applies a time stamp based on the clock output from an input timer 57 to the input TS packet. The TS packet having the time stamp applied by the time stamp applying unit 56 is input to an arbiter 58. The TS packet input into the arbiter 58 is stored in an input FIFO 61 of an SDRAM 60 under the control of an SDRAM controller 59. The SDRAM controller 59 controls the packets to be written into the input FIFO 61 and read from an output FIFO 62 in the SDRAM 60 in accordance with an instruction from an FIFO controller 63.

The TS packet stored in the input FIFO 61 is read under the control of the SDRAM controller 59, and output via the arbiter 58 to an index applying unit 64. The index applying unit 64 applies an index composed of a searching stamp, a Logical Block Address (LBA) and a user area to a cluster of 128 Kbytes that is a recording unit onto the hard disk 42, and outputs the cluster to a selector 67. To the selector 67, the data input via a bus interface 29 or a command from the DMA controller 68 is input. The selector 67 selects the input TS packet, data and command for output to a predetermined device. For example, a TS packet output from the index applying unit 64 and input into the selector 67 is output to a hard disk IF 24, further to the hard disk drive 15, and recorded in the hard disk 42.

In reproducing the TS packet recorded in the hard disk 42 by the hard disk drive 15, the hard disk controller 41 (FIG. 1) controls the reproduced transport stream to be read as a sequence of the TS packets recorded in the hard disk 42, and output to the hard disk controlling section 50. In the hard disk controlling section 50, the reproduced transport stream input via the hard disk IF 24 is output via the selector 67 to the index detector 66.

The index detector 66 detects the index added by the index applying unit 64 from the input reproduced transport stream. The detected index is stored in a register within the DMA, controller 68, which then controls the DMA controller 68 on the basis of the stored index.

The index detector 66 detects the index, and the reproduced transport stream from which the index is removed is once stored via the arbiter 58 and the SDRAM controller 59 in the output FIFO 62 of the SDRAM 60. The reproduced transport stream stored in the output FIFO 62 is read into the arbiter 58 and further output to the time stamp detector 54 under the control of the SDRAM controller 59. The time stamp detector 54 detects a time stamp from the input reproduced transport stream, and outputs the reproduced transport stream to the output PID parser 52 at a timing of restoring the time interval between the TS packets in accordance with its time stamp. The output PID parser 52 receives the reproduced transport stream output from the time stamp detector 54, extracts a reproducing packet from the TS packets making up the reproduced transport stream, and outputs the reproducing packet to the MUX 53.

The MUX 53 multiplies the TS packet output from the output PID parser 52 and the TS packet output from the input PID parser 51, and outputs the multiplied TS packet to the link layer IC 16 (FIG. 1).

The link layer IC 16 transfers isochronously the reproduced transport stream received from the switch 31 via the physical layer IC 17 on the IEEE 1394 serial bus, or via the DEMUX 18 and the decoder 19 to the monitor.

Herein, in the case where the received transport stream is recorded in the hard disk 42, the hard disk controlling section 50 identifies I picture subjected to intra-frame coding, its identified result being added to the index information of each cluster.

Figure 3:
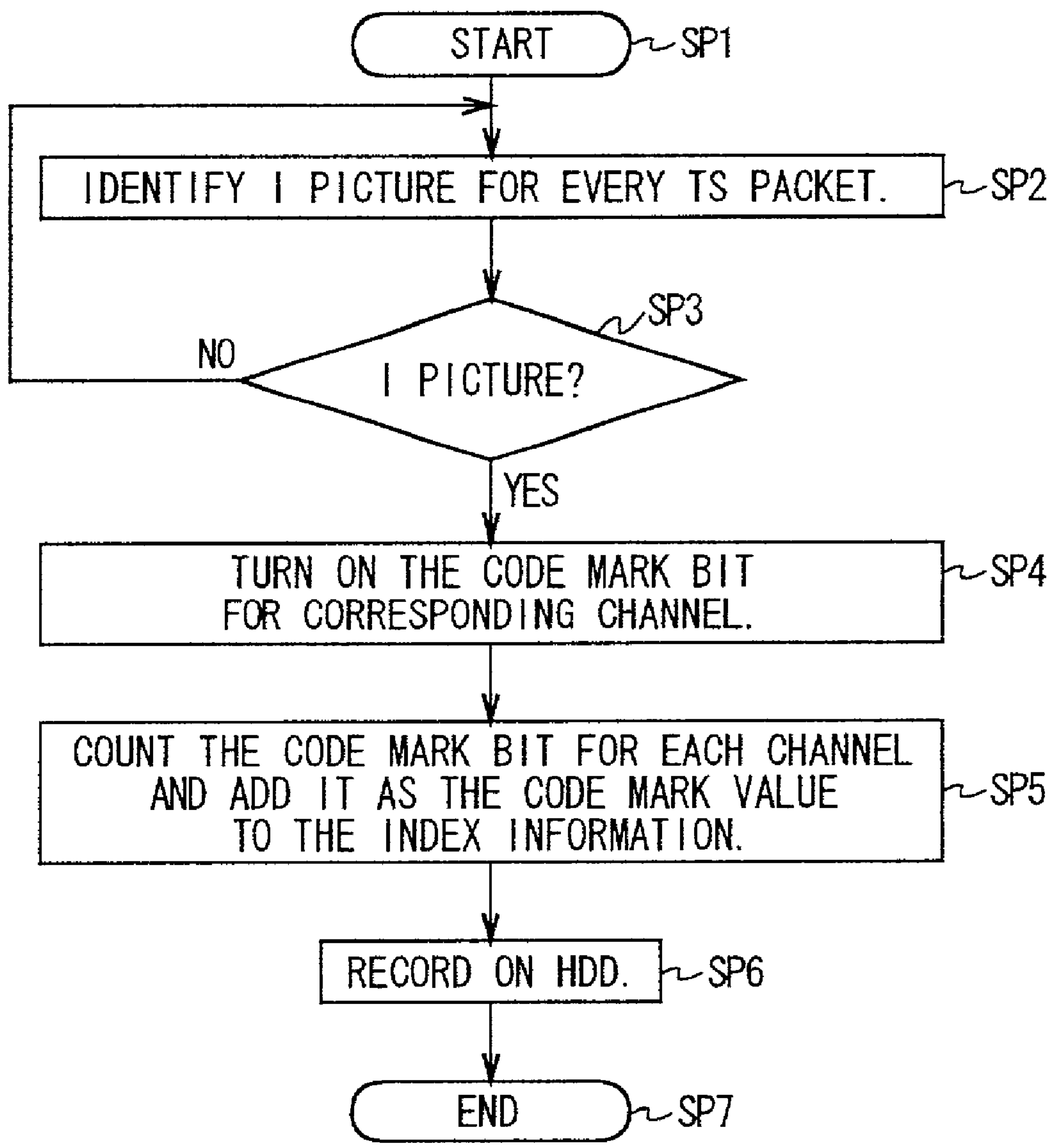
FIG. 3 is a flowchart showing a recording operation procedure of a transport stream onto the hard disk.

That is, the hard disk controlling section 50 enters a recording operation procedure onto the hard disk at step SP1 as shown in FIG. 3. Then at step SP2, for each TS packet output from the input PID parser 51, a code detector 101 discriminates the picture type from the identification code described in the TS packet. In this case, for each TS packet, a code portion indicating other than the MPEG image is added with "0×000001" at the leading part. Accordingly, the code detector 101 can discriminate whether or not the TS packet has a start code of I picture by detecting the code "0×000001" of the TS packet and analyzing the data series that subsequently occur.

And if a negative answer is obtained at step SP3 in FIG. 3, this means that the TS packet being analyzed is not the packet containing the start code of I picture, in which the code detector 101 returns to step SP2 to analyze the TS packet that follows.

On the contrary, if an affirmative answer is obtained at step SP3, this means that the TS packet being analyzed contains the start code of I picture, in which the hard disk controlling section 50 goes to the next step SP4.

At step SP4, the hard disk controlling section 50 turns on a code mark bit indicating the presence of the start code of I picture at the further leading part of the time stamp added at the leading part of the TS packet by the time stamp applying unit 56, for the TS packet which is discriminated to contain the start code of I picture at step SP3.

Figures 4A, 4B:
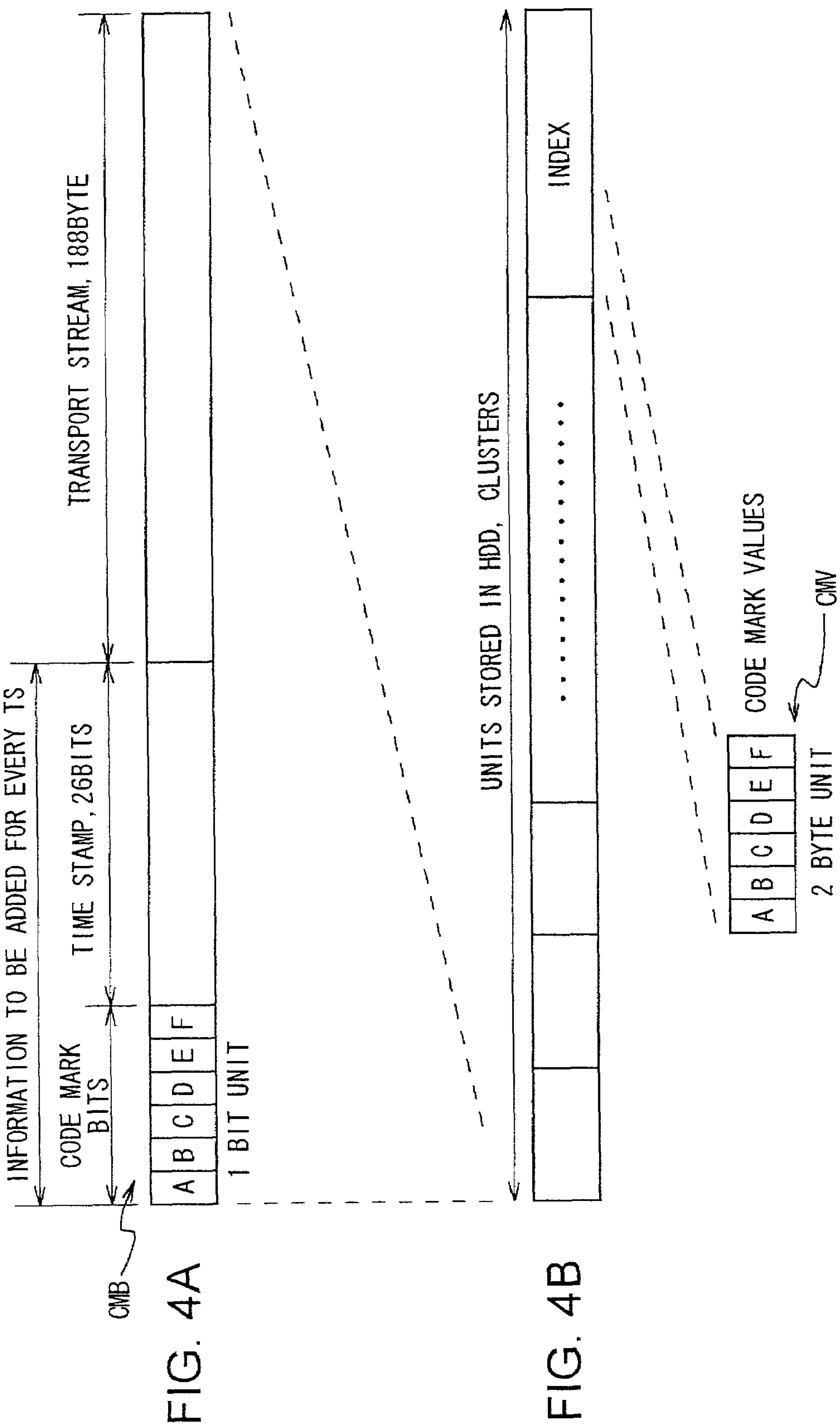
FIGS. 4A and 4B are schematic diagrams for explaining the code mark bit and its addition to the index information.

That is, a time stamp of 26 bits is added to the leading part of the TS packet of 188 bytes by the time stamp applying unit 56, as shown in FIG. 4A. Then, in the time stamp applying unit 56, the code mark bit CMB is turned on, if the TS packet to add the time stamp contains the start code of I picture on the basis of a detected result of the code detector 101. This code mark bit CMB has a bit corresponding to each channel distinguished by the Packet ID (PID) (6 bits corresponding to 6 channels in this embodiment), the bit corresponding to PID in the TS header added to the leading part of the TS packet being turned on as the code mark bit. For example, in the case where the PID of the TS packet being analyzed at present indicates a first channel, a first bit corresponding to the first channel (i.e., a bit at an "A" location of the code mark bit CMB as shown in FIG. 4A) is turned on as the code mark bit.

And the hard disk controlling section 50 transfers from step SP4 to step SP5, as shown in FIG. 3, where the code mark is counted by the code mark counter 110 for every cluster that is a recording unit onto the hard disk 42. That is, in the case where a cluster of 512 Kbytes is produced, the cluster contains a plurality of TS packets, the number of TS packets containing the start code of I picture among the plurality of TS packets within the cluster is counted by the code mark counter 110. In this case, the code mark counter 110 is made to count the code mark for every channel classified by the PID of the TS packet.

And the count result is added to the index information of cluster for each channel, as shown in FIG. 4B. The code mark count value (hereinafter referred to as a code mark value) for each channel is described in a unit of 2 bytes.

Thereby, the number of TS packets containing the start code of I picture among the plurality of TS packets contained in a cluster is described in the index of the cluster on a channel basis.

In this way, if the code mark value is described in the index of cluster, the hard disk controlling section 50 transfers to step SP6 as shown in FIG. 3, where each cluster is sent to the hard disk drive 15 and recorded in the hard disk 42. Then at step SP7, this operation procedure is ended.

Figure 5:
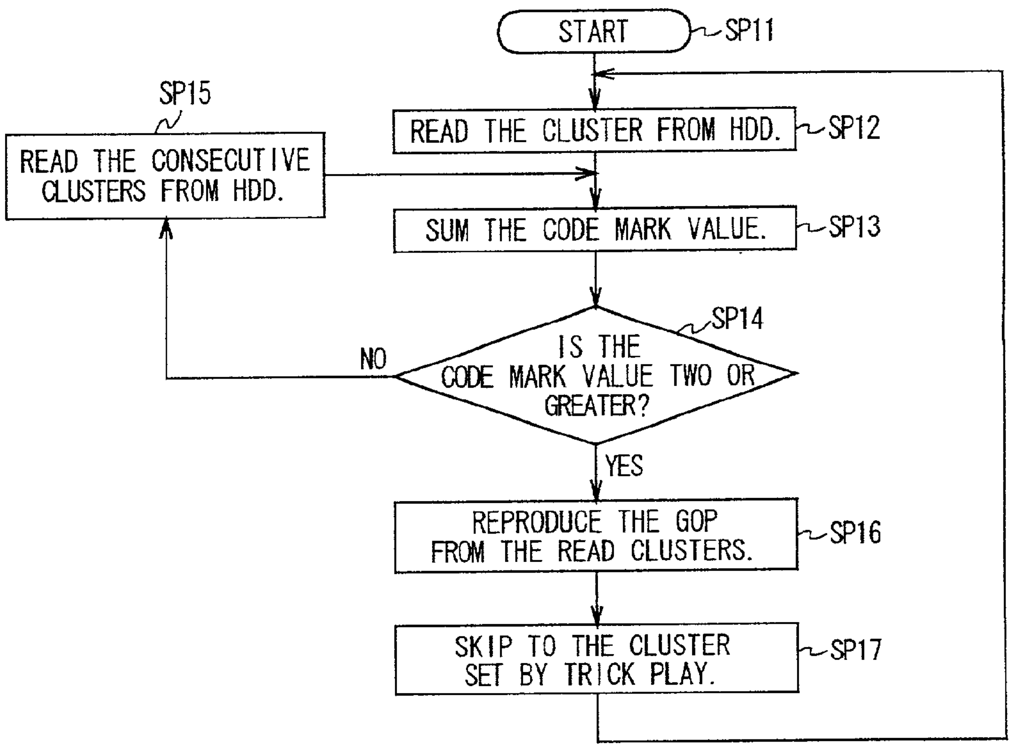
FIG. 5 is a flowchart for explaining a trick playback operation procedure from the hard disk.

Explanation will be given below of a case where a stream of packets for a predetermined channel is reproduced (skip fast playback) from the hard disk 42 in trick play in a state where the TS packet is recorded in the hard disk 42 in a unit of cluster in the above way, If the DMA controller 68 of the hard disk controlling section 50 is specified with a trick playback by an input operation of the user, a trick playback operation procedure as shown in FIG. 5 is entered at step SP11. Then at step SP12, the cluster is read from the hard disk 42.

At step SP13, the index detector 66 detects an index from the cluster read from the hard disk 42, and sums the code mark value written in the detected index for the reproducing channel. That is, the code mark corresponding to the reproducing channel among the code mark values CMV described in a unit of 2 bytes for each channel is detected and summed, as shown in FIG. 4B.

At this time, if the summation result of code mark value read from the first cluster (e.g., cluster C1 of FIG. 6D) is equal to "0", this means that there is no TS packet containing the start code of I picture within the first cluster. Then the DMA controller 68 obtains a negative answer at step SP14. The procedure transfers to step SP15, where the second cluster C2 following the first cluster is read from the hard disk 42, and the code mark value of the second cluster C2 is summed to the summed code mark value of the first cluster C1.

And if the summation result of the code mark value is "1", this means that there is one TS packet containing the start code of I picture among the TS packets within the cluster C2 read at this time. In this case, it can be found that the leading part I1 (FIG. 6D) of GOP in the cluster read at this time exists, on the basis of the feature of the GOP structure having the I picture located at the leading part.

And the DMA controller 68 further transfers to step SP15 in this case, where a cluster C3 consecutive to the cluster C2 read at this time is read and the code mark value of the read cluster is summed to the previous summation result.

Figures 6A, 6B, 6C, 6D:
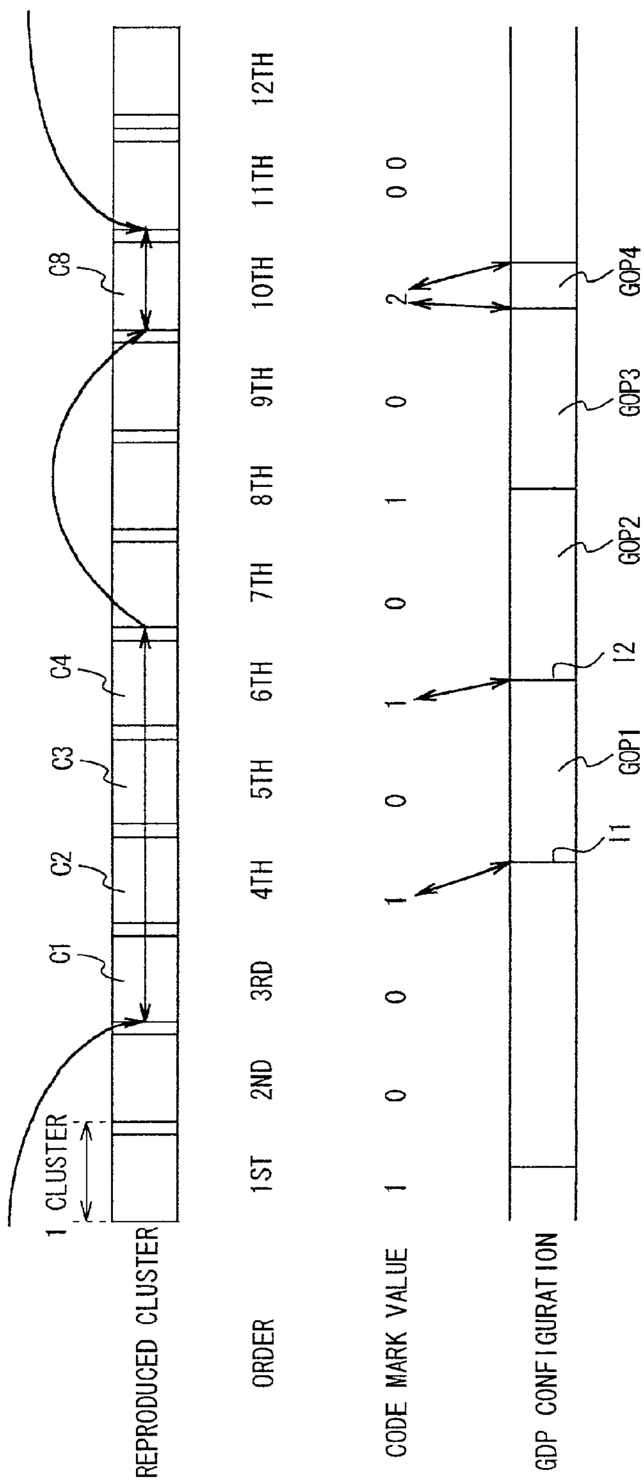
FIGS. 6A to 6D are schematic diagrams for explaining the GOP playback on the basis of the code mark value.

The DMA controller 68 repeats an operation of steps SP13, SP14 and SP15. If the summation result of the code mark values is 2 or greater, this means that there are two or more TS packets containing the start code of I picture within the already read clusters (e.g., clusters C1, C2, C3 and C4 as shown in FIG. 6A), that is, two leading parts I1 and I2 of GOP exist, and at least one complete GOP1 exists. Thus, the DMA controller 68 transfers from step S14 to step SP16 to reproduce the GOP1 contained in the cluster with the code marks summed.

Thereby, one complete GOP is reproduced. If the GOP is reproduced, the DMA controller 68 transfers to step SP17, to skip a predetermined number of clusters that is to be skipped at the trick playback. Then it returns to step SP12 to read a cluster C8 from the hard disk 42. Thus, the hard disk controlling section 50 can read a plurality of clusters containing the GOP, and then perform a trick playback by skipping a predetermined number of clusters.

In this connection, since the summation result of the code mark value of one cluster C8 as shown in FIG. 6A is "2", it can be found that one GOP is contained within the cluster C8. In this case, the DMA controller 68 reproduces the GOP from one cluster C8 and then performs a trick playback by skipping a predetermined number of clusters.

In this way, the hard disk controlling section 50 can securely reproduce the cluster containing the TS packets making up the GOP from the skipped location, and extract and reproduce the GOP required to constitute a reproduced image.

In the above constitution, when the hard disk controlling section 50 reproduces a transport stream from the hard disk 42, it effects a trick playback (fast reproduction) by skipping a predetermined number of images from the consecutive images (pictures). In this case, the B picture or P picture to produce an image by referring to the pictures before and after a picture constituting the GOP can not constitute the image itself, whereby it is required to reproduce one complete GOP containing the I picture. Accordingly, the playback is started from the cluster up to which the clusters are skipped by trick playback, and the consecutive clusters are read till one complete GOP is read to reproduce the read GOP, whereby a full image of one GOP can be played back.

When the code mark bit is added to the leading part of each TS packet, as described above and shown in FIG. 4A, a bit corresponding to each channel is prepared, and the code mark bit is turned on at the bit corresponding to the channel of TS packet, so that the channel can be readily discriminated on the basis of the location of the code mark bit.

And the summation result of the code mark bits for each channel is described in an index of each cluster as a code mark value for each channel, whereby the code mark value (the number of start codes of I picture) for each channel can be readily discriminated by referring to the code mark value of the index.

With the above constitution, the code mark indicating the leading part of GOP is counted for each cluster, whereby the GOP can be easily detected from the top of GOP to the last. Also, the code mark is described for each channel, whereby even if the multi stream containing a plurality of channels is recorded in the hard disk 42, the GOP can be easily detected for each channel.

In this connection, since the code mark is described to detect the GOP, there is no need of discriminating the I picture, P picture and B picture at every time of reproduction, so that the CPU load can be reduced.

The hard disk controlling section 50 has a simplified configuration because there is no need of storing the positional information of GOP in other memory.

In this embodiment, the trick playback is effected in a unit of GOP by detecting the top and last locations of the GOP. However, the present invention is not limited to this embodiment, but the trick playback can be performed by reproducing the TS packets only corresponding to the code mark bit, that is, the I picture only.

In this embodiment, the code mark value is described in the index of cluster when the transport stream is recorded in the hard disk 42. However, this invention is not limited to this embodiment, but after the transport stream is recorded in the hard disk 42, the code mark bit of each TS packet is identified, and the index (code mark value) of the recorded cluster can be rewritten on the basis of the identified result.

In this embodiment, it is discriminated whether or not the I picture (start code of I picture) exists within the TS packet. However, this invention is not limited to this embodiment, but the GOP header or sequence header can be identified.

In this embodiment, the hard disk is used as the storage device. However, this invention is not limited to this embodiment, but various sorts of storage devices can be employed.

As described above, with the present invention, in recording a stream in a storage device, a packet containing a start part of encoded image data subjected to intra-frame coding is identified from the input stream of packets, presence or absence information of the start part of the encoded image data subjected to intraframe coding is added to the packet on the basis of an identified result, the added presence or absence information of the start part is counted in a recording unit onto the storage device, and the count result is added in the recording unit onto the storage device, whereby the number of start parts of the encoded image data subjected to intra-frame coding in every recording unit, together with the recording unit, can be recorded on the storage device. In playback, the number of start parts recorded in a recording unit on the storage device is detected to identify the recording units to be reproduced.

Therefore, the recording units to be reproduced can be easily identified in the playback after skipping a predetermined number of recording units.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An information recording apparatus for recording a stream of packets describing encoded image data in a predetermined format in a storage device, said apparatus comprising:

identification means for identifying said packet containing a start part of said encoded image data subjected to intra-frame coding from said input stream of packets;

addition means for adding to said packet presence or absence information of the start part of said encoded image data subjected to intra-frame coding on the basis of an identified result;

counting means for counting the added presence or absence information of the start part in a recording unit onto said storage device; and count result addition means for adding a count result in said recording unit onto said storage device.

2. The information recording apparatus according to claim 1 wherein said addition means adds the presence or absence information of the start part of said encoded image data to said packet on a channel basis; said count means counts the presence or absence information of the start part for each channel; and said count result addition means adds the count result for each channel in said recording unit on a channel basis.

3. An information reproducing apparatus for reproducing a stream of packets describing encoded image data in a predetermined format from a storage device where said stream of packets is recorded in a predetermined recording unit with a plurality of recording units being recorded in a cluster, said apparatus comprising:

reproducing means for reproducing clusters of recording units containing packets, at least one of said recording units containing a start part of encoded image data subjected to intra-frame coding on the basis of the information of said start part added in said recording unit, the encoded image data including an identifier for identifying said packets containing said start part, for identifying presence or absence information identifying the presence or absence of said encoded image data subjected to intra-frame coding and for identifying a count representing the number of encoded image data subjected to intra-frame encoding in said cluster; and skip playback means for reproducing said recording unit containing at least the start part, and then skipping a predetermined number of recording units to detect a start part in a subsequent cluster.

4. The information reproducing apparatus according to claim 3 wherein the information associated with said start part is added to said recording unit on a channel basis of said encoded image data; and said reproducing means detects the information of said start part in the channel for reproduction.

5. An information recording/reproducing apparatus for recording and reproducing a stream of packets describing encoded image data in a predetermined format in and from a predetermined storage device, said apparatus comprising:

identification means for identifying said packet containing a start part of said encoded image data subjected to intra-frame coding from said input stream of packets;

addition means for adding to said packet presence or absence information of the start part of said encoded image data subjected to intra-frame coding on the basis of an identified result;

counting means for counting the added presence or absence information of the start part in a recording unit onto said storage device;

count result addition means for adding a count result in said recording unit onto said storage device to record on said storage device;

reproducing means for reproducing said recording unit recorded on said storage device on the basis of said count result added in said recording unit and recorded on said storage device; and skip playback means for reproducing said recording unit containing at least said start part, and then skipping a predetermined number of recording units to detect the information of said start part added.

6. The information recording/reproducing apparatus according to claim 5 wherein said addition means adds the presence or absence information of the start part to said packet on a channel basis of said encoded image data;

said count means counts the presence or absence information of said start part for each channel;

said count result addition means adds the count result for each channel in said recording unit on said channel basis; and said reproducing means reproduces said recording unit for a channel for reproduction on the basis of a result of detecting the information of said start part in said channel for reproduction.

7. An information recording method for recording a stream of packets describing encoded image data in a predetermined format in a storage device, said method comprising the steps of:

identifying said packet containing a start part of said encoded image data subjected to intra-frame coding from said input stream of packets;

adding to said packet the presence or absence information of the start part of said encoded image data subjected to intra-frame coding on the basis of an identified result;

counting the added presence or absence information of said start part in a recording unit onto said storage device; and adding said count result in said recording unit onto said storage device.

8. The information recording method according to claim 7 wherein said step of adding the presence or absence information of the start part of said encoded image data subjected to intra-frame coding to said packet involves adding the presence or absence information of said start part to said packet on a channel basis of said encoded image data;

said step of counting the presence or absence information of said start part added in said recording unit onto said storage device involves counting the presence or absence information of said start part for each channel; and said step of adding the count result in said recording unit involves adding the count result for each channel in said recording unit on said channel basis.

9. An information reproducing method for reproducing a stream of packets describing encoded image data in a predetermined format from a storage device where said stream of packets is recorded in a predetermined recording unit with a plurality of recording units being recorded in a cluster, said method comprising the steps of:

reproducing clusters of recording units containing packets, at least one of said recording units containing a start part of encoded image data subjected to intra-frame coding on the basis of the information of said start part added in said recording unit, the encoded image data including an identifier for identifying said packets containing said start part, for identifying presence or absence information identifying the presence or absence of said encoded image data subjected to intra-frame coding and for identifying a count representing the number of encoded image data subjected to intra-frame encoding in said cluster; and detecting the information of the start part added by skipping a predetermined number of recording units, after reproducing said recording unit containing at least said start part.

10. The information reproducing method according to claim 9 wherein the information associated with said start part is added to said recording unit on a channel basis of said encoded image data, and said step of reproducing said recording unit containing the start part of said encoded image data subjected to intra-frame coding on the basis of the information of said start part added in said recording unit involves detecting the information of said start part in a channel for reproduction.

11. An information recording/reproducing method for recording and reproducing a stream of packets describing encoded image data in a predetermined format in a predetermined storage device, said method comprising the steps of:

identifying said packets containing a start part of said encoded image data subjected to intra-frame coding from said input stream of packets;

adding to said packet presence or absence information of the start part of said encoded image data subjected to intra-frame coding on the basis of an identified result;

counting the added presence or absence information of said start part in a recording unit onto said storage device;

adding said count result in said recording unit onto said storage device to record on said storage device;

reproducing said recording unit recorded on said storage device on the basis of said count result added in said recording unit and recorded on said storage device; and detecting the information of said start part added by skipping a predetermined number of recording units after reproducing said recording unit containing at least said start part.

12. The information recording/reproducing method according to claim 11 wherein the step of adding the presence or absence information of the start part of the encoded image data subjected to said intra-frame coding to said packet involves adding the presence or absence information of the start part to said packet on a channel basis of said encoded image data;

the step of counting the presence or absence information of said start part added in said recording unit onto said storage device involves counting the presence or absence information of said start part for each channel;

the step of adding the count result in said recording unit onto said storage device to record onto said storage device involves adding the count result for each channel in said recording unit on said channel basis; and the step of reproducing said recording unit recorded on said storage device on the basis of said count result added in said recording unit and recorded on said storage device involves detecting the information of said start part in a channel for reproduction and reproducing said recording unit of said channel on the basis of a detected result.

13. An digital broadcasting receiving apparatus for receiving a stream of packets describing encoded image data in a predetermined format transmitted from a broadcasting station and recording said stream in a predetermined built-in storage device, said apparatus comprising:

identification means for identifying said packet containing a start part of said encoded image data subjected to intra-frame coding from said received stream of packets;

addition means for adding to said packet presence or absence information of the start part of said encoded image data subjected to intra-frame coding on the basis of an identified result; counting means for counting the added presence or absence information of the start part in a recording unit onto said storage device; and count result addition means for adding a count result in said recording unit onto said storage device.

14. The digital broadcasting receiving apparatus according to claim 13 wherein said storage device is an HDD.

15. The digital broadcasting receiving apparatus according to claim 13 wherein said addition means adds the presence or absence information of the start part of said encoded image data to said packet on a channel basis;

said count means counts the presence or absence information of the start part for each channel; and said count result addition means adds the count result for each channel in said recording unit on a channel basis.

16. A digital broadcasting receiving apparatus for receiving a stream of packets describing encoded image data in a predetermined format transmitted from a broadcasting station and reproducing said stream from a storage device where said stream is recorded in a predetermined recording unit with a plurality of recording units being recorded in a cluster, said apparatus comprising:

reproducing means for reproducing clusters of recording units containing packets, at least one of said recording units containing a start part of encoded image data subjected to intra-frame coding on the basis of the information of said start part added in said recording unit, the encoded image data including an identifier for identifying said packets containing said start part, for identifying presence or absence information identifying the presence or absence of said encoded image data subjected to intra-frame coding and for identifying a count representing the number of encoded image data subjected to intra-frame encoding in said cluster; and skip playback means for reproducing said recording unit containing at least the start part, and then skipping a predetermined number of recording units to detect a start part in a subsequent cluster.

17. The digital broadcasting receiving apparatus according to claim 16 wherein said storage device is an HDD.

18. The digital broadcasting receiving apparatus according to claim 16 wherein the information associated with said start part is added to said recording unit on a channel basis of said encoded image data; and said reproducing means detects the information of said start part in the channel for reproduction.

19. A digital broadcasting receiving apparatus for receiving a stream of packets describing encoded image data in a predetermined format transmitted from a broadcasting station, and recording and reproducing said stream in and from a predetermined storage device, said apparatus comprising:

identification means for identifying said packet containing a start part of said encoded image data subjected to intra-frame coding from said received stream of packets;

addition means for adding to said packet presence or absence information of the start part of said encoded image data subjected to intra-frame coding on the basis of an identified result;

counting means for counting the added presence or absence information of the start part in a recording unit onto said storage device; count result addition means for adding a count result in said recording unit onto said storage device to record on said storage device;

reproducing means for reproducing said recording unit recorded on said storage device on the basis of said count result added in said recording unit and recorded on said storage device; and skip playback means for reproducing said recording unit containing at least said start part, and then skipping a predetermined number of recording units to detect the information of said start part added.

* * * * *